United States Patent
Bohner et al.

(10) Patent No.: US 6,209,677 B1
(45) Date of Patent: Apr. 3, 2001

(54) STEERING SYSTEM FOR NON-TRACKED MOTOR VEHICLES

(75) Inventors: Hubert Bohner, Boeblingen; Martin Moser, Fellbach; Reinhold Schneckenburger, Rutesheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/392,650

(22) Filed: Sep. 9, 1998

(30) Foreign Application Priority Data

Sep. 9, 1998 (DE) .............................. 198 41 101

(51) Int. Cl.$^7$ ...................................... B62D 5/00
(52) U.S. Cl. .................. 180/406; 180/405; 180/403; 180/402
(58) Field of Search ................... 180/402, 403, 180/405, 406, 407, 421, 446

(56) References Cited

U.S. PATENT DOCUMENTS

| | | | |
|---|---|---|---|
| 5,020,618 | * | 6/1991 | Nagao .................................. 180/403 |
| 5,050,696 | * | 9/1991 | McGovern et al . ................. 180/406 |
| 5,056,311 | * | 10/1991 | Tischer ................................ 180/403 |
| 5,263,321 | * | 11/1993 | Thomsen et al. .................... 180/403 |
| 5,862,878 | * | 1/1999 | Bohner et al. ....................... 180/403 |
| 5,893,427 | * | 4/1999 | Bohner et al. ....................... 180/403 |
| 5,926,676 | * | 10/1998 | Ko ....................................... 180/403 |
| 6,047,788 | * | 4/2000 | Bohner et al. ....................... 180/406 |

* cited by examiner

Primary Examiner—Daniel G. DePumpo
(74) Attorney, Agent, or Firm—Evenson, McKeown, Edwards & Lenahan, P.L.L.C.

(57) ABSTRACT

A steering system of a non-tracked motor vehicle whose steered vehicle wheels are connected in the normal operation with respect to the effect with a steering handle only by way of an electronic automatic control unit which continuously monitors itself with respect to a correct operation. As a function of a desired-value generator, which is operated by the steering handle, and an actual-value generator operated by the vehicle wheels, this automatic control system operates an adjusting drive for the steering adjustment of the steered vehicle wheels. In the event of a malfunctioning of the automatic control system, a forced coupling is automatically switched effective between the steering handle and the steered vehicle wheels. When the forced coupling is switched on, the steering system operates as much as possible in the manner of a conventional power steering system. In that event, the forces and torques transmitted between the steering handle and the steered vehicle wheels by way of the forced coupling are determined while utilizing the occurring elastic distortion of the forced coupling.

5 Claims, 3 Drawing Sheets

STEERING SYSTEM FOR NON-TRACKED MOTOR VEHICLES

BACKGROUND OF THE INVENTION

The present invention relates to a steering system for non-tracked motor vehicles, having a steering handle, such as a manual steering wheel, operated by the driver, a steering adjusting drive for the steering adjustment of steerable vehicle wheels, a steering-angle desired-value generator operable by the steering handle, and a steering-angle actual-value generator operable by means of the steerable vehicle wheels. An automatic control system controls the steering adjusting drive as a function of a comparison of the desired and actual values of the steering angle and continuously monitors itself as well as a sensor system interacting with it with respect to a malfunctioning. A mechanical or hydraulic forced coupling is arranged between the steering handle and the steerable vehicle wheels, and is opened up or remains open (inoperative normal condition) when the automatic control system operates correctly and is automatically closed when the automatic control system is defective (operative special condition).

Steering systems of this type, which operate according to the "steer-by-wire" concept, are basically known and are developed for future motor vehicles. These systems offer the basic advantage that they are suitable at least with respect to the automatic control system as well as the associated sensor system without any constructive changes for many different vehicles. As a result of a corresponding programming, on one hand, virtually any transmission ratio can be implemented between the adjusting stroke of the steering handle and the steering angle change of the steered vehicle wheels. Furthermore, the automatic control system can be connected with additional sensors in order to be able to automatically take into account parameters to be defined, such as cross wind influences, or control deviations with respect thereto.

In order to be able to ensure the required amount of safety in the event of the occurrence of a defect in the automatic control system or in the event of a failure of signals which are to be analyzed by the automatic control system, an operating mode can be automatically switched on for an abnormal operation or an emergency operation. In this operating mode, a forced coupling is provided between the steering handle and the steered vehicle wheels so that the steering system operates in principle in the manner of a conventional steering system. The mechanical steering column, which is customary in conventional steering systems, can be replaced, however, by other mechanical systems or by hydraulic systems, particularly hydrostatic systems.

SUMMARY OF THE INVENTION

An object of the present invention is to provide, in a steering system of the steer-by-wire type, measures which are advantageous with respect to the operational reliability of the system.

According to the invention, this object has been achieved in that the forced coupling (which was switched to be in effect) has a defined elasticity. When the forced coupling is in effect, forces and torques, which can be transmitted between the steering handle and the steered vehicle wheels, cause a relative adjustment between the desired-value generator for the steering angle and the actual-value generator for the steering angle. In the special condition (i.e., forced coupling was switched to be in effect), when the residual function of the automatic control system and the sensor system is sufficient, the steering system operates as a power steering system. That is, the automatic control system controls the steering adjusting drive analogously to the amount and the direction of the relative adjustment which can be detected from the signals of the desired-value generator for the steering angle and the actual-value generator for the steering angle, for generating a power steering force with a direction which reduces the transmitted forces and torques.

The invention is based on the recognition of the advantages of reducing, when the forced coupling is in effect, to the extent possible, the manual forces on the steering handle to be applied by the driver and, for this purpose, operating the steering system analogously to a conventional power steering system. In this context, the automatic control system is to control the steering adjusting drive for generating a power steering force reducing the manual forces.

The present invention utilizes the fact that the forced coupling, which was switched on in the event of an emergency between the steering handle and the steered vehicle wheels, may have a corresponding elastic flexibility because of elastic flexibilities of the coupling elements or coupling media. As a result, between the end or input on the steering handle side and the end or output of the forced coupling assigned to the steered vehicle wheels, during the transmission of forces and torques, more or less large relative movements occur which result in corresponding relative adjustments between the desired-value generator for the steering angle and the actual-value generator for the steering angle. According to the invention, in the special condition of the steering system, the above-mentioned desired-value and actual-value generators are now used for detecting these relative adjustments and thus for detecting the transmitted forces and torques.

Thus, while the desired-value and actual-value generators are used in the normal condition of the steering system for determining the desired-value actual-value deviation of the steering angle, in the special condition, they are also utilized for determining the forces and torques transmitted between the steering handle and the steered vehicle wheels. Because of this double function of the desired-value and the actual-value generator, the comfort of a conventional power steering system can be achieved without additional sensors in the special operation.

It is only necessary to configure the automatic control system such that it detects the relative positions of the desired-value and actual-value generators which exist immediately during the switching-on of the forced coupling. Since immediately at the point in time of the switching-on of the forced-coupling, no forces or torques are yet transmitted between the steered vehicle wheels and the steering handle, the above-mentioned relative position is characteristic of a strain-free forced coupling.

A special advantage of the invention resides in the fact that the technical construction of the forced coupling can be arbitrary. The reason is that it is of minor significance for implementing the invention whether the forced coupling takes place by mechanical elements or hydraulically. In the former, the elastic deformability of the mechanical elements is utilized. In the latter, the elastic flexibility of the walls of the hydraulic lines as well as the compressibility of the hydraulic medium are utilized.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
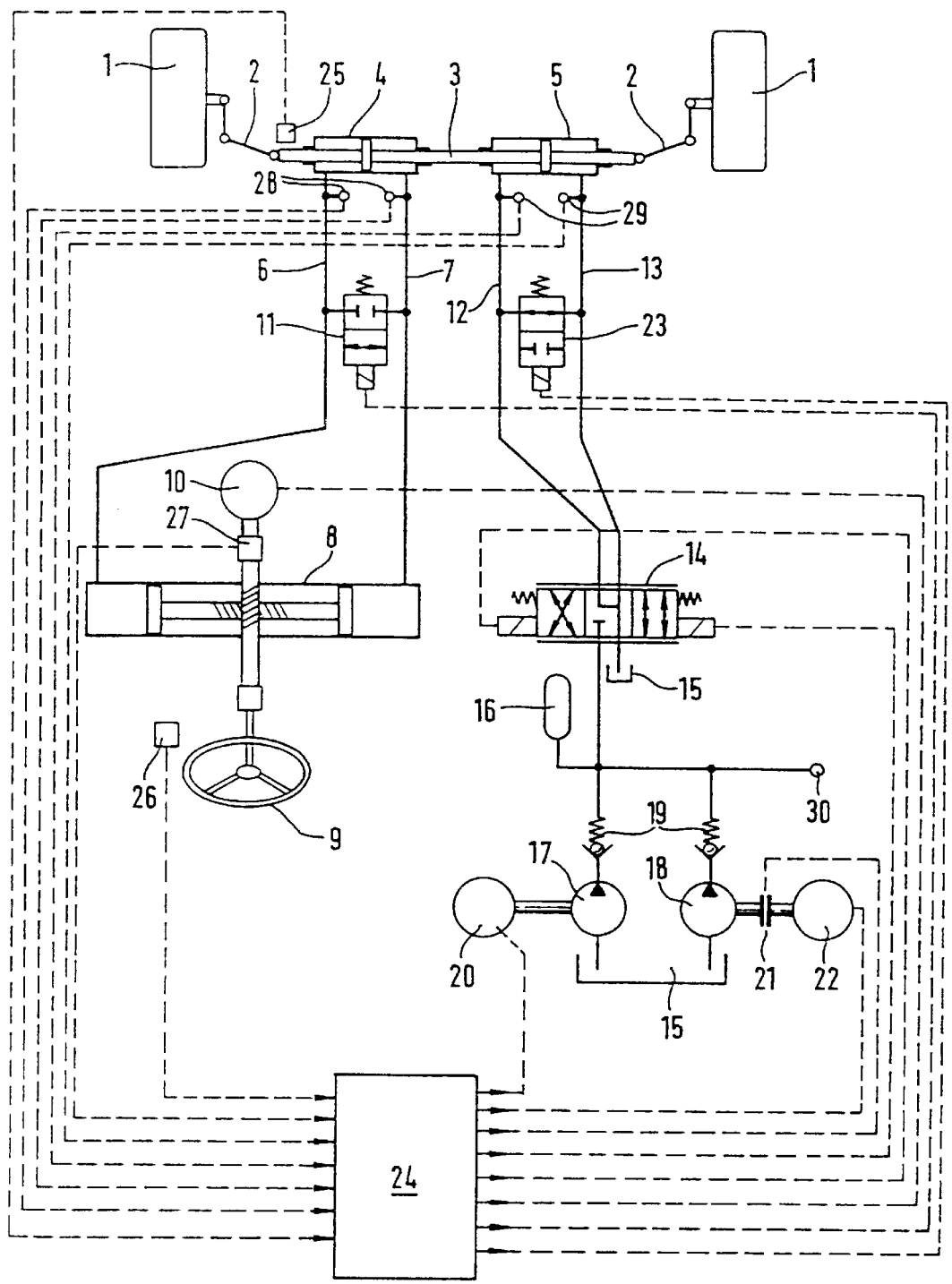
FIG. 1 is a schematic diagram of a first embodiment of the steering system of the present invention.

In the embodiment illustrated in FIG. 1, a motor vehicle has steerable front wheels 1, which are coupled with one another for adjustable steering of the vehicle by way of tie rods 2 as well as a piston rod 3 which forms the piston rod of two piston-cylinder units 4, 5 which are arranged coaxial or parallel to one another and are each constructed as double-acting units.

The piston-cylinder unit 4 is coupled via two hydraulic lines 6, 7 with the two piston working spaces of a double-acting piston-cylinder unit 8, whose pistons are mechanically forcibly coupled with a manual steering wheel 9. The pistons of the unit 8 are displaced to the right or the left when the manual steering wheel 9 is turned clockwise or counterclockwise. During the displacement of the pistons of the piston-cylinder unit 8, the manual steering wheel 9 is rotated correspondingly.

In addition, the manual steering wheel 9 is connected with respect to the drive with reversible electric motor 10. When the engine shaft is stopped, the motor 10 is capable of operating as a pure power generator whose purpose will be explained below.

A normally closed shut-off valve 11 is arranged between the hydraulic lines 6, 7 which, by the energization of the valve's operating magnet, can be switched over against the force of a restoring spring, from the illustrated closed position into its open position. When the electric current acting upon the operating magnet of the valve 11 is switched off, the valve is automatically brought by the restoring spring into the illustrated closed position where it is held.

By way of hydraulic lines 12, 13, the piston-cylinder unit 5 is connected with two connections of a control valve 14 which is connected by way of two additional connections with a relatively pressureless hydraulic reservoir 15 and a hydraulic pressure source, in the illustrated example, a hydraulic pressure accumulator 16 as well as pumps 17, 18. The pressure accumulator 16 can be recharged by the pump 17 as well as another pump 18. Both pumps 17, 18 are secured by return valves 19 against a return from the delivery side to their suction side and, on the suction side, are connected to the reservoir 15. The pump 17 is driven by an electric motor 20. By way of a shiftable clutch 21, the pump 18 can be connected with the engine 22 of the motor vehicle.

A normally open shut-off valve 23 is arranged between the hydraulic lines 12, 13 which can be changed, by the electric energization of its operating magnet, against the force of a restoring spring from the illustrated open position into its closed position and can be held in this closed position.

An electronic automatic control and control system 24 is connected on the input side with a signal generator 25 (hereinafter, generator) for the actual value of the steering angle of the front wheels 1. This generator 25 can interact, for example, with the rod 3 which, during the steering adjustment of the wheels 1, carries out an adjusting stroke analogous to the steering angle. In addition, the input side of the automatic control and control system 24 is connected with a generator 26 for the desired value of the steering angle operated by the manual steering wheel 9.

Furthermore, the input side of the automatic control and control system 24 is connected with a torque sensor 27 which senses the forces and torques effective between the manual steering wheel 9 as well as the electric motor 10.

Finally, pressure sensors 28, 29, 30 are connected to the input side of the automatic control and control system 24. The signals of these pressure sensors reflect the hydraulic pressures in the hydraulic lines 6, 7, 12, 13, as well as the pressure at the pressure input of the control valve 14. On the output side, the automatic control and control system 24 is connected with the operating magnets of the shut-off valves 11, 23 and of the control valve 14. In addition, the electric motors 10, 20 as well as the clutch 21 are controlled by the output of the automatic control and control system 24.

In the normal operation of the steering system of FIG. 1, the switch-over valves 11, 23 are changed into the positions which are not shown and are held in these positions by the automatic control and control system 24 by energization of their associated operating magnets. The piston-cylinder unit 4 is correspondingly hydraulically uncoupled from the piston-cylinder unit 8 as well as from the manual steering wheel 9.

The pressure difference between the two piston working spaces of the piston-cylinder unit 5 is controlled by the operation of the control valve 14. Specifically, by way of the generator 25, the automatic control and control system 24 detects the actual value of the steering angle of the front wheels 1. The automatic control and control system 24 receives the desired value of the steering angle by way of the generator 26 operated by the manual steering wheel. Corresponding to a desired-actual value comparison carried out by the automatic control and control system 24, the operating magnets of the control valve 14 are then controlled.

If there is no desired-actual value deviation, the control valve 14 remains in the illustrated center position, in which the piston-cylinder unit 5 is hydraulically switched to free-running and is connected with the reservoir 15, while the pressure accumulator 16, which, as a function of the signal of the pressure sensor 30, is constantly recharged, as required, by way of the pumps 17, 18, is shut-off with respect to the piston-cylinder unit 5.

If a desired-actual value deviation occurs, the control valve 14 is displaced from the illustrated center position, according to the direction of the desired actual value deviation, toward the right or the left. Thereby, in each case, one piston working space of the piston-cylinder unit 5 is controllably connected with the pressure connection of the control valve 14 and the other piston working space of the unit 5 is controllably connected with the reservoir 15. A controllable pressure difference becomes effective at the piston-cylinder unit 5 with the result that the piston-cylinder unit 5 generates an adjusting force in a direction defined by the direction of the desired-actual value deviation of the steering angle. In this manner, a desired-actual value deviation of the steering angle is controlled within a short time and the front wheels 1 follow the steering adjustment of the manual steering wheel 9.

From the signals of the pressure sensors 29 and/or from the electric voltages and current intensities on the operating magnets of the control valve 14, the automatic control and control system 24 can directly or indirectly determine the pressure difference effective at the piston-cylinder unit 5, whose extent is correlated with the forces and torques transmitted between the steered wheels 1 and the piston-cylinder unit 5. In a correlation with these forces, the automatic control and control system 24 determines a desired value for a manual force which can be felt at the manual steering wheel 9.

This desired value is set by a corresponding control of the electric motor 10, whereby the torque sensor 27 senses the forces and torques effective between the electric motor 10 and the manual steering wheel 9 and thus detects the actual value of the manual force. As a result, the motor 10 is controlled as a function of a desired-actual value comparison for the manual forces. In this manner, the driver obtains at the manual steering wheel 9 a sense-of-touch or haptic feedback of the forces effective between the steered vehicle wheels 1 and the piston-cylinder unit 5.

The automatic control and control system 24 continuously monitors itself with respect to a correct operation. Furthermore, the signals of the generators and sensors 25 to 30 connected with the input side of the automatic control and control system 24 are continuously checked with respect to their plausibility. Should a system error be determined, the operating magnet of the shut-off valve 11 is switched to a current-free state with the result that the shut-off valve 11 switches over into the closed position illustrated in FIG. 1 and the piston-cylinder units 4 and 8, and thus the steerable front wheels 1 and the manual steering wheel 9, are forcedly hydraulically coupled with one another.

If a sufficient residual function exists of the automatic control and control system 24 as well as of the sensor system interacting therewith, the steering system according to the invention, when the forced coupling is switched on, operates in the manner of a conventional power steering system. That is, as a function of the forces and torques transmitted between the manual steering wheel 9 and the steered vehicle wheels 1, the automatic control and control system 24 controls the control valve 14 such that the piston-cylinder unit 5 generates a power steering force which reduces the manual force to be applied at the manual steering wheel 9.

For detecting the forces and moments transmitted between the manual steering wheel 9 and the steered vehicle wheels 1, the elasticity of the hydraulic coupling between the piston-cylinder units 4 and 8 is utilized in the embodiment of FIG. 1. On the basis of the compressibility of the hydraulic medium as well as the elastic flexibility of the walls of the hydraulic lines 6, 7 as well as of the cylinders of the piston-cylinder units 4, 8, a more or less large elastic flexibility occurs between the manual steering wheel 9 and the steered vehicle wheels 1 with the result that relative movements can occur between the manual steering wheel 9 and the steered vehicle wheels 1. These relative movements deviate from the transmission ratio of the driving connection between the manual steering wheel 9 and the steered vehicle wheels 1.

Such relative movements can be determined from the signals of the desired-value and actual-value generators 25, 26 if the automatic control and control unit 24 "knows" the relative positions of the two sensors 25, 26 when the hydraulic forced coupling is switched on between the manual steering wheel 9 and the steered vehicle wheels 1. At the point in time of the switching-on of the forced coupling, a condition of the forced coupling exists which is virtually free of forces. Because of the constructively defined transmission ratio between rotating movements of the manual steering wheel 9 and steering movements of the wheels 1, the automatic control and control system 24 can then determine, for each rotating position of the manual steering wheel 9 detected from the signals of the sensor 26, a steering position of the steered vehicle wheels 1 to be expected or a signal of the sensor 25 which is to be expected correspondingly. If the actual signal of the sensor 25 then deviates in one or the other direction from the signal to be expected, this means that a corresponding force or a corresponding torque is transmitted in one or the other direction between the manual steering wheel 9 and the steered vehicle wheels 1. As a result, the automatic control and control system 24 can then hydraulically control the piston-cylinder unit 5 by a corresponding adjustment of the control valve 14 such that this unit 5 generates a power steering force which assists the respective steering maneuver by the driver.

Figure 2:
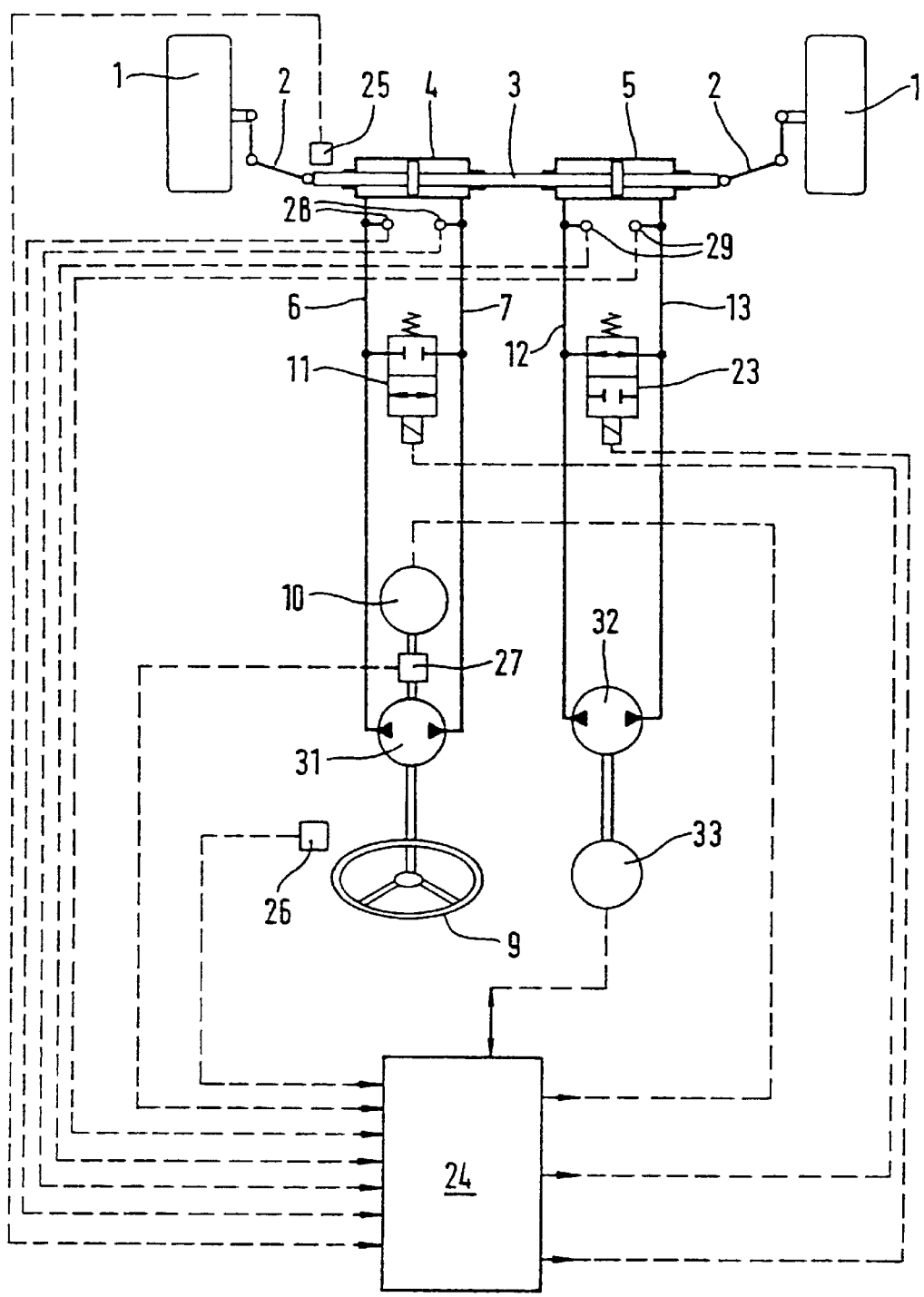
FIG. 2 is a schematic diagram of a second embodiment.

The embodiment illustrated in FIG. 2 differs from the arrangement according to FIG. 1 essentially in that the pistoncylinder unit 8 is replaced by a hydrostatic reversible pump 31, whereby hydraulic medium can be exchanged between the hydraulic lines 6, 7. With respect to the drive, this pump 31 is, on one hand, forcedly coupled with the electric motor 10 and, on the other hand, with the manual steering wheel 9. Another reversible, and preferably also hydrostatic, pump 32 can connect the hydraulic lines 12, 13. For driving the pump 32, an electric motor 33 is operated by the automatic control and control system 24.

The method of operation of the embodiment of FIG. 2 largely corresponds to the method of operation of the embodiment of FIG. 1 which has already been described at length. When the switch-over valve 11 takes up its closed position, the hydrostatic pump 31 and the piston-cylinder unit 4 and thus the steerable vehicle wheels 1 and the manual steering wheel 9 are forcedly coupled with one another.

A forced coupling will take place if the automatic control and control system 24 determines the existence of a malfunction in the steering system. If, in such a case, a malfunction exists on parts of the hydraulic system of the piston-cylinder unit 5 or seems likely, the current supply of the magnet of the switch-over valve 23 is automatically switched off so that the switch-over valve 23 changes over into the open position illustrated in FIG. 2 and the piston-cylinder unit 5 is under all circumstances hydraulically switched to free running.

In normal operation, that is, when the automatic control and control system 24 detects no malfunction, the switch-over valves 11, 23 are held by the automatic control and control system 24 in each case in their positions not illustrated in FIG. 2. The electric motor 33 is then operated by the automatic control or control system as a function of a desired-actual value comparison of the steering angle. That is, the motor 33 operates as a function of the difference between the signals of the generators 25, 26, in one or the other direction with a more or less high adjusting force so that the piston-cylinder unit 5 transmits a corresponding adjusting force to the steered wheels 1.

Also in the embodiment of FIG. 2, the automatic control and control system 24, when the forced coupling between the manual steering wheel 9 and the steered vehicle wheels is switched on, can again determine from the signals of the sensors 25, 26, the forces and torques transmitted between the manual steering wheel 9 and the steered vehicle wheels. As a function thereof, the system 24 can control the electric motor 33 to generate an adjusting force analogous to the above-mentioned forces and torques. This adjusting force is then hydraulically transmitted by the pump 32 driven by the electric motor 33 and by the hydraulic lines 12, 13 to the piston cylinder unit 5 so as to affect the steering as a power steering force.

Figure 3:
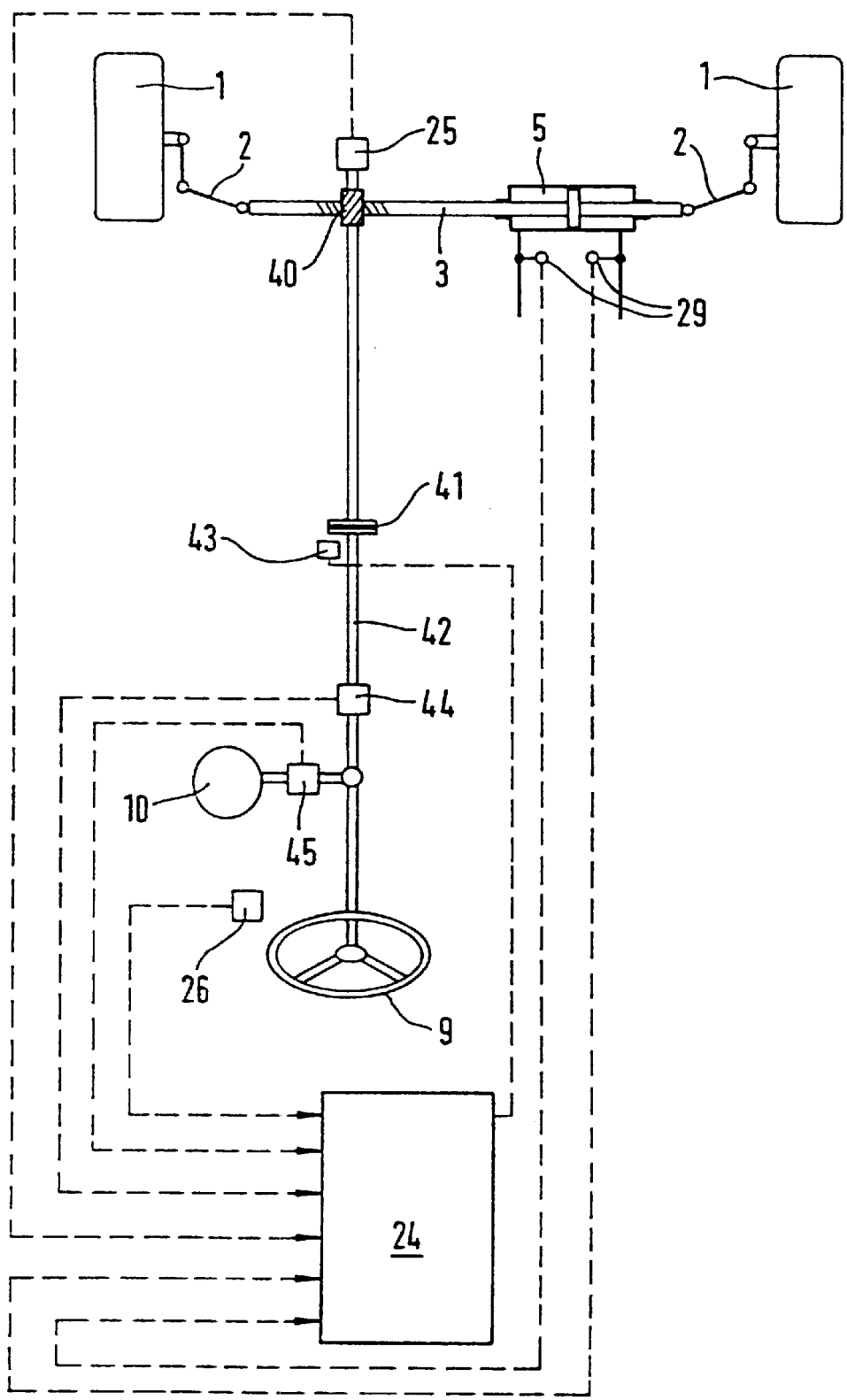
FIG. 3 is a schematic diagram of a third embodiment of the invention.

The embodiment illustrated in FIG. 3 differs from the above-described embodiments first in that, for an emergency, a mechanical through-drive is provided between the manual steering wheel 9 and the steered vehicle wheels 1. For this purpose, the rod 3 in the illustrated embodiment is arranged as a toothed rack which meshes with a pinion 40 which, in turn, is mechanically connected with the manual steering wheel 9 by way of a clutch 41, which is acted upon in the closing direction by a spring, and an adjoining shaft 42. The clutch 41 can be opened by a servo motor against the force of its closing spring in order to open up a mechanical through-drive between the steered vehicle wheels and the manual steering wheel 9. With respect to the drive, this shaft 42 is also connected with a not irreversible electric motor 10 (non-irreversibly). Torque sensors 44, 45 are arranged between the manual steering wheel 9 and the shaft 42 as well as between the electric motor 10 and the shaft 42.

The pinion 40 is connected with the generator 25 for determining the actual value of the steering angle which is constructed as an angle sensor. The shaft 42 is connected on the manual steering wheel 9 with the generator 26 which is also constructed as an angle sensor and which is used as a generator for the desired value of the steering angle in the normal operation. In addition, the rod 3 again forms the piston rod of the piston-cylinder unit 5 which can be operated again in a like manner to the embodiments of FIGS. 1 and 2.

In normal operation, the servo motor 43 of the clutch 41 is continuously energized by the automatic control and control system 24 such that it holds open the clutch 41 against the force of its closing spring. Furthermore, the automatic control and control system 24 operates the piston-cylinder unit 5 or the elements controlling this unit 5 such that, as the result of the adjusting forces generated by the unit, a possible difference is controlled between the desired value of the steering angle supplied by the generator 26 and the actual value of the steering angle supplied by the generator 25. For this purpose, reference is made to the descriptions of the embodiments of FIGS. 1 and 2. In the event of possible system disturbances, the servo motor 43 is switched off by the automatic control and control system 24, so that the clutch 41 closes and the manual steering wheel and the steered vehicle wheels 1 are forcedly coupled with one another.

Also in the embodiment of FIG. 3, when the forced coupling is switched on, a more or less large elastic flexibility occurs between the manual steering wheel 9 and the steered vehicle wheels 1. The elastic flexibility is based particularly on the torsional elasticity of the shaft portions between the pinion 40 and the manual steering wheel 9. As a result, the control and automatic control system 24 can again determine, from the signals of the sensors 25, 26, the forces and torques transmitted between the manual steering wheel 9 and the steered vehicle wheels 1 and, as a function thereof, can control the adjusting force of the steering adjusting drive, in the embodiment of FIG. 3, a piston-cylinder unit 5.

Departing from the embodiments illustrated in the drawings but within the scope of the present invention, the torque sensors 27, 44 can also be arranged on the manual steering wheel side of the unit 8 or of the pump 31 or of the driving connection between the motor 10 and the shaft 42.

Should, when the emergency operation mode is switched on, i.e. the forced coupling between the manual steering wheel 9 and the steered vehicle wheels 1 becomes effective, the electric motor 10 still generates a torque. The influence of the generated torque on the signal difference between the signals of angle sensors 25, 26 can be compensated mathematically. As a result, only the signal difference between the sensors 25, 26 caused by manual forces is used for controlling a power steering force generated by the unit 5 and/or by the electric motor 10. For this mathematical compensation, for example, stored experimental values can be taken into account for the dependence of the above-mentioned signal difference on the forces and torques effective between the manual steering wheel 9 and the steered vehicle wheels 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering system for non-tracked motor vehicles, comprising
   a driver operable steering handle;
   a steering adjusting drive for steering adjustment of steerable vehicle wheels;
   a steering-angle desired-value signal generator arranged to be operable by the steering handle;
   a steering-angle actual-value signal generator arranged to be operable by the steerable vehicle wheels,
   a continuously self monitoring automatic control system arranged to control the steering adjusting drive as a function of a comparison of desired and actual values of a steering angle and to continuously monitor an associated malfunction sensor system;
   and a forced coupling operatively arranged between the steering handle and the steerable vehicle wheels and configured to be opened up or remain open in an inoperative normal condition when the automatic control system operates correctly and to be automatically closed when the automatic control system is malfunctioning during an operative condition, wherein the forced coupling has a defined elasticity such that, in a switched-on condition of the forced coupling, forces and torques are transmittable between the steering handle and the steered vehicle wheels and cause a relative adjustment between the desired-value and actual-value signal generators, and, in the operative condition with a sufficient residual function of the automatic control system and the sensor system, the steering adjusting drive is controlled in accordance with an amount and direction of relative adjustment detectable from the signals of the desired-value and actual-value signal generators for generating a power steering force with a direction which reduces the transmittable forces and torques.

2. The steering system according to claim 1, wherein the automatic control system is configured to record the relative positions or signals of the desired-value and actual-value generators immediately during the switching-on of the forced coupling and to then determine, for each signal of the desired-value generator, while taking into account the constructively defined ratio between the adjusting strokes of the steering handle and the steered vehicle wheels, a signal of the actual-value generator which is to be expected, whereby the steering adjusting drive is controlled as a function of an expected difference between the actual signal and the signal of the actual-value generator as long as the forced coupling remains switched on.

3. The steering system according to claim 1, wherein the forced coupling is a hydraulic forced coupling operatively provided between the steering handle and the steered vehicle wheels.

4. The steering system according to claim 3, wherein the automatic control system is configured to record the relative positions or signals of the desired-value and actual-value generators immediately during the switching-on of the forced coupling and to then determine, for each signal of the desired-value generator, while taking into account the constructively defined ratio between the adjusting strokes of the steering handle and the steered vehicle wheels, a signal of the actual-value generator which is to be expected, whereby the steering adjusting drive is controlled as a function of an expected difference between the actual signal and the signal of the actual-value generator as long as the forced coupling remains switched on.

5. The steering system according to claim 1, wherein the forced coupling is a mechanical forced coupling operatively provided between the steering handle and the steered vehicle wheels.

* * * * *